United States Patent
Dayan et al.

(10) Patent No.: US 7,171,568 B2
(45) Date of Patent: Jan. 30, 2007

(54) REMOTE POWER CONTROL IN A MULTI-NODE, PARTITIONED DATA PROCESSING SYSTEM

(75) Inventors: Richard A. Dayan, Wake Forest, NC (US); Gregory B. Pruett, Raleigh, NC (US); David B. Rhoades, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 10/461,569

(22) Filed: Jun. 13, 2003

(65) Prior Publication Data
US 2004/0255172 A1    Dec. 16, 2004

(51) Int. Cl.
*G06F 1/26* (2006.01)
(52) U.S. Cl. ............... 713/300; 713/310; 713/323; 709/215; 709/220; 709/221; 370/318
(58) Field of Classification Search ............... 713/1, 713/2, 100, 300, 310, 323; 712/28, 29; 707/10; 709/217–222, 215; 370/318
See application file for complete search history.

(56) References Cited

U.S. PATENT DOCUMENTS

| | | | |
|---|---|---|---|
| 4,335,426 A | | 6/1982 | Maxwell et al. |
| 4,925,311 A | * | 5/1990 | Neches et al. ............... 718/100 |
| 5,165,018 A | | 11/1992 | Simor |
| 5,561,768 A | * | 10/1996 | Smith ........................... 712/13 |
| 5,671,356 A | | 9/1997 | Wang |
| 5,717,942 A | * | 2/1998 | Haupt et al. .................. 712/13 |
| 5,768,585 A | | 6/1998 | Tetrick et al. |
| 5,872,968 A | | 2/1999 | Knox et al. |
| 5,937,201 A | | 8/1999 | Matsushita et al. |
| 5,960,175 A | | 9/1999 | Grossman |
| 6,065,053 A | | 5/2000 | Nouri et al. |
| 6,314,515 B1 | | 11/2001 | Miller et al. |

(Continued)

OTHER PUBLICATIONS

Kubala et al., Coordinating Multiple Server Partitions to Enter Power-Save State, IBM Technical Disclosure Bulletin, v. 39, n. 6, Jun. 1996, pp. 235-240, IBM Corporation.

*Primary Examiner*—A. Elamin
*Assistant Examiner*—Nitin C. Patel
(74) *Attorney, Agent, or Firm*—Joseph P. Lally; Cynthia S. Byrd

(57) ABSTRACT

A system and method for remote power control across multiple nodes of a partitioned data processing system. The system includes one or more nodes, each node including a chassis housing a traditional SMP server. The system may be partitioned into two or more SPAR's. Partition management software provides out of band power control to an entire partition, regardless of the number of nodes in the partition. The partition management code installed on each node of the partition is enabled to broadcast a power-on request to each of the nodes in the partition. Thus, when any service processor receives a power-on request, that service processor will resend the power on request to the broadcast group, thereby causing all of the nodes in the SPAR to power up. The broadcast packets may be routed to the other nodes via an out-of-band or private management LAN. Using this implementation, existing network and system management software can reset the system by sending a normal power-on request to any service processor in the SPAR complex thereby minimizing the multi-node architecture's impact.

20 Claims, 3 Drawing Sheets

U.S. PATENT DOCUMENTS

| | | | |
|---|---|---|---|
| 6,334,177 B1 * | 12/2001 | Baumgartner et al. | 712/13 |
| 6,336,134 B1 | 1/2002 | Varma | |
| 6,415,330 B1 | 7/2002 | Okanoue | |
| 6,421,775 B1 * | 7/2002 | Brock et al. | 713/1 |
| 6,453,426 B1 | 9/2002 | Gamache et al. | |
| 6,684,343 B1 * | 1/2004 | Bouchier et al. | 714/4 |
| 6,807,579 B1 * | 10/2004 | Frazier | 709/245 |
| 6,820,207 B2 * | 11/2004 | Dawkins et al. | 713/324 |
| 6,842,430 B1 * | 1/2005 | Melnik | 370/254 |
| 6,918,052 B2 * | 7/2005 | Bouchier et al. | 714/4 |
| 2002/0083118 A1 | 6/2002 | Sim | |
| 2002/0087611 A1 | 7/2002 | Tanaka et al. | |
| 2002/0124165 A1 | 9/2002 | Smith et al. | |
| 2002/0133727 A1 | 9/2002 | Dervin et al. | |
| 2003/0037224 A1 * | 2/2003 | Oehler et al. | 712/29 |

* cited by examiner

REMOTE POWER CONTROL IN A MULTI-NODE, PARTITIONED DATA PROCESSING SYSTEM

BACKGROUND

1. Field of the Present Invention

The present invention generally relates to the field of data processing systems and more particularly to resetting or powering up logically partitioned, multi-node, data processing systems.

2. History of Related Art

In data processing systems generally and standalone server systems more particularly remote power control has been achieved by using a wake-on-LAN(WOL) feature or dedicated service processor to provide an out-of-band method for remotely powering the system. This approach was logical and simple because there was a one-to-one correspondence between the dedicated service processor or network interface card (NIC), for example, and the "system," which consisted of one or more processors sharing a single set of resources (memory, I/O devices, etc.) within a single chassis. More recently, however, manufacturers have been redefining the architecture of stand-alone server systems to enable greater scalability and performance. The Enterprise X Architecture (EXA) from IBM Corporation, for example, is a scalable technology that enables a customer to combine multiple server "nodes" into a logically integrated unit that shares the resources of the combined system. Using this architecture, four nodes, each of which is a four-way symmetric multiprocessor (SMP) system are logically integrated to provide a 16-way super system that shares all the memory and I/O resources of the individual nodes. Moreover, this multi-node system can then be logically partitioned into two or more logical systems. The 16-way SMP system, for example, may be logically partitioned into two static partitions (SPARs) including a 3-node (12-way) SPAR running a Unix environment and a 1-node (4-way) SPAR running Windows®). Once the partition configuration is achieved, the system can be configured to be booted as multiple independent partitions.

While this ability to scale and logically partition individual server systems enables customers to manage their information technology investment by paying only for the processing capabilities currently needed, this type of scalable architecture does introduce complexities not found in conventional, standalone machines. Remote power management, for example, has traditionally been achieved using a WOL procedure or a dedicated service processor that provides an out-of-band method for remotely powering on the system. In a multi-node, statically partitionable architecture, however, the "system" may span multiple physical nodes, each with separate power control switches, separate network interface cards (NICs) and separate BIOS and POST code. With traditional standalone server implementations, traditional power control via a service processor network can only restore power on a single node. Multi-node, partitioned architectures, however, may require simultaneous restoration of system power to multiple nodes. It would be desirable, therefore, to provide a system and method for remote power control on a multi-node, partitionable architecture.

SUMMARY OF THE INVENTION

The problem identified above is addressed according to the present invention by a system and method for remote power control across multiple nodes of a logically distinct data processing system. The system includes one or more nodes, each node including a chassis housing a traditional SMP server. The system may be partitioned into two or more SPAR's. Partition management software provides out of band power control to an entire partition, regardless of the number of nodes in the partition. The partition management code installed on each node of the partition is enabled to broadcast a power-on request to each of the nodes in the partition. Thus, when any service processor receives a power-on request, that service processor will resend the power on request to the broadcast group, thereby causing all of the nodes in the SPAR to power up. The broadcast packets may be routed to the other nodes via an out-of-band or private management LAN. Using this implementation, existing network and system management software can reset the system by sending a normal power-on request to any service processor in the SPAR complex thereby minimizing the multi-node architecture's impact.

BRIEF DESCRIPTION OF THE DRAWINGS

Other objects and advantages of the invention will become apparent upon reading the following detailed description and upon reference to the accompanying drawings in which.

Figure 1:
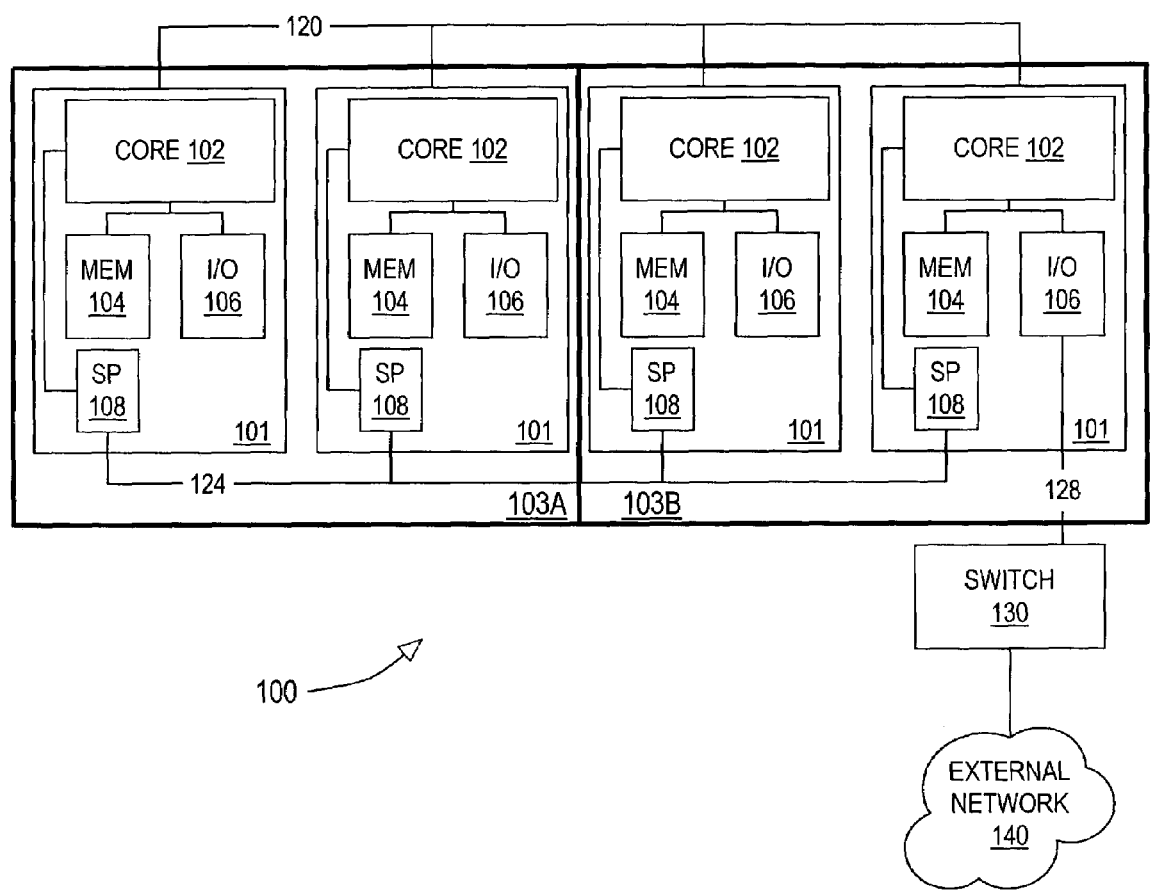
FIG. 1 is a block diagram of selected elements of a data processing network suitable for implementing one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention encompasses a method and system for enabling remote power management in a multi-node partitioned architecture. The system includes multiple physical nodes connected by an interconnect network referred to herein as a scalability link. Each physical node includes a service processor. The multi-node system may be partitioned into two or more partitions, where each partition may span the boundaries between different physical nodes. Partition management code running on each partition invites each service processor in the partition complex to join a multicast group. When a power-on request is subsequently received by any of the service processors in the partition, the request can be broadcast to each service processor in the partition thereby effectively achieving simultaneous power-on in a multi-node configuration.

Turning now to the drawings, FIG. 1 illustrates selected elements of a data processing system 100 suitable for use with the present invention. In the depicted embodiment, system 100 includes a set of four interconnected nodes 101 where each node 101 is operable as a stand alone server having its own chassis, power supplies, firmware, and cooling fans. Each node 101 further includes a central processing core 102, system memory 104, and I/O devices collectively represented in FIG. 1 by reference numeral 106. Each core 102 may include multiple microprocessor devices that share the system memory 104 such that each node 101 is suitable for use as a symmetrical multiprocessor (SMP) system. I/O 106 includes, for example, any fixed or direct access storage device (DASD) the node may include. The core 102, system memory 104, and I/O 106 may be implemented as a scalable server system such as, for example, the xSERIES x440 server from IBM Corporation. In one particular embodiment that illustrates the scalability of system 100, each node 101 includes a core 102 with four x86-type microprocessors. In this implementation, four nodes 101 can be merged to form a 16-way SMP system or partition that enjoys the benefits of combined resources while overcoming limitations (such as system bus bandwidth) that limit the scalability of conventional (i.e., single node) SMP configurations.

Each node 101 as depicted in FIG. 1 includes service processor facilities 108. In an embodiment that facilitates remote power-on management according to the present invention, service processor 108 includes remote supervisory facilities. These facilities enable functionality including graphical console redirection, keyboard and mouse control, remote management independent of the server status, and remote control of hardware and operating systems. Service processor 108 also enables remote update of the server's firmware (including the firmware of the supervisory facilities themselves). In one embodiment, service processor 108 is implemented as an adapter that is connected via a PCI or other suitable I/O bus. An example of this type of service processor facility is the Remote Supervisory Adapter (RSA) from IBM Corporation.

In the scalable partition embodiment referred to above, system 100 is implemented in a merged resource configuration. In this configuration, the processing, memory, and I/O resources of each individual node 101 are shared by the system 100 as a whole to achieve scalable performance. Individual nodes 101 are interconnected with a scalability link 120 that makes the processing, memory, and I/O resources of each node available to the system 100 under a single operating system image. Scalability link 120 is a bi-directional high-speed link that connects the system busses of each node 101.

Moreover, the multi-node system 100 may be logically divided or partitioned into two or more virtual machines referred to herein as static partitions (SPAR's) identified by reference numerals 103A and 103B (generically or collectively referred to as SPAR(s) 103), each of which can run in its own environment. As depicted in FIG. 1, each partition 103 is a multi-node (i.e., multi-chassis) system operating under a single operating system image. The multiple physical nodes of the partition are transparent to application programs. In a partition configuration, some conventional I/O resources on some of the nodes may be eliminated. In one embodiment, for example, only one node of the partition requires and includes a keyboard, display monitor, mouse, and removable media disk drive.

As depicted in FIG. 1, service processors 108 of each node 101 communicate with each other via a link 124 that is sideband with respect to scalability link 120. In one embodiment, the service processor link is implemented with a standard serial link such as an RS-485 or RS-232 link. In other embodiments, service processors 108 communicate via a standard 10/100 Ethernet link using IP protocols. In either embodiment, the service processors 108 have their own independent states including their own dedicated system memory and their own power states. Thus, service processors 108 are suitable for tasks including powering a node's main power supply (the power provided to core 102 and memory 104) on and off. System 100 as depicted is connected to an external network 140 via a connection 128 and switch 130 that connects to a NIC or other suitable interconnection device in the I/O 106 of one of the nodes 101. Connection 128 permits partition 101 access to a larger network such as an enterprise intranet or the Internet.

Once a system is configured as one or more partitions 103, it is highly desirable to boot each partition as a single unit by executing a partition boot sequence following a reset on any of the individual nodes 101. During the partition boot sequence, each individual node 101 executes a portion of its own boot program before deferring control to the partition sequence. Following a reset, each node 101 within a partition 103 turns on its internal power supplies and performs its system BIOS including its power on self test (POST). The individual node boot sequences would then collectively defer to a designated primary node or boot node that would determine what system resources are present and configure the resources as a single group of resources that is available to application programs.

The partition boot sequence is complicated by the presence of multiple nodes. In a multi-node architecture, it is likely that the service processor on only a single node, referred to herein as the boot node, has information regarding the partition configuration. The remaining service processors are unaware of the partition configuration including which nodes comprise the partition. This presents a problem for system management software, which is typically written under the assumption that a system reset request delivered to the service processor module of a standalone system is sufficient to boot the system to the desired state. The present invention overcomes this hurdle by incorporating a process by which a reset on any of the partition nodes produces a partition-wide reset whether or not the reset node has partition configuration information.

Figure 2:
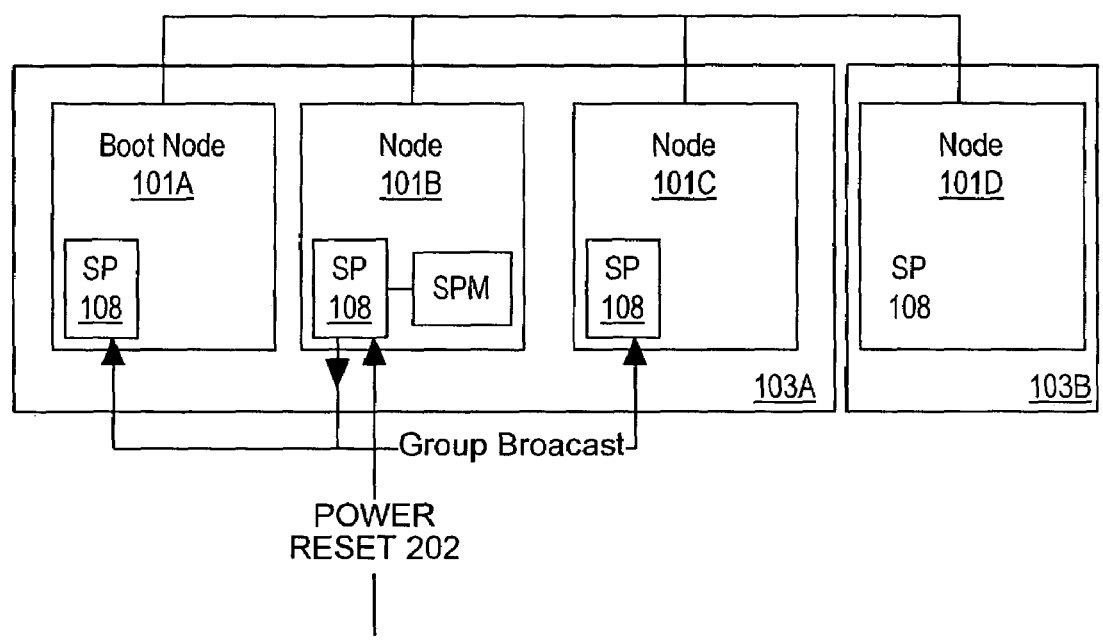
FIG. 2 is a block diagram of selected elements of the data processing network of FIG. 1 emphasizing partition boot features of the present invention.

Referring now to FIG. 2, a conceptual illustration of selected elements of system 100 according to the present invention is presented to emphasize functionality of the present invention. As illustrated in FIG. 2, system 100 includes four nodes 101 that are configured as two partitions 103A and 103B. First partition 103A is a three-node partition including nodes 101A, 101B, and 101C while second partition 103B is a single node partition comprised of node 101D.

First partition 103A is a multi-node partition that includes a boot node 101A, and two subordinate nodes 101B and 101C. System 100 may include partition management software responsible for configuring the partition(s) 103. Such partition management software may include, for example, portions of a System Partition Manager (SPM) in the Director product from IBM Corporation. IBM Director enables viewing and tracking of hardware configuration of remote systems in detail and monitoring of-usage and performance of critical components, such as processors, disks, and memory. As described above with respect to FIG. 1, each node 101 includes its own service processor 108. The first node 101A is designated as the boot node. The boot node executes the partition boot sequence following a reset to configure partition 103A in its multi-node configuration.

Figure 3:
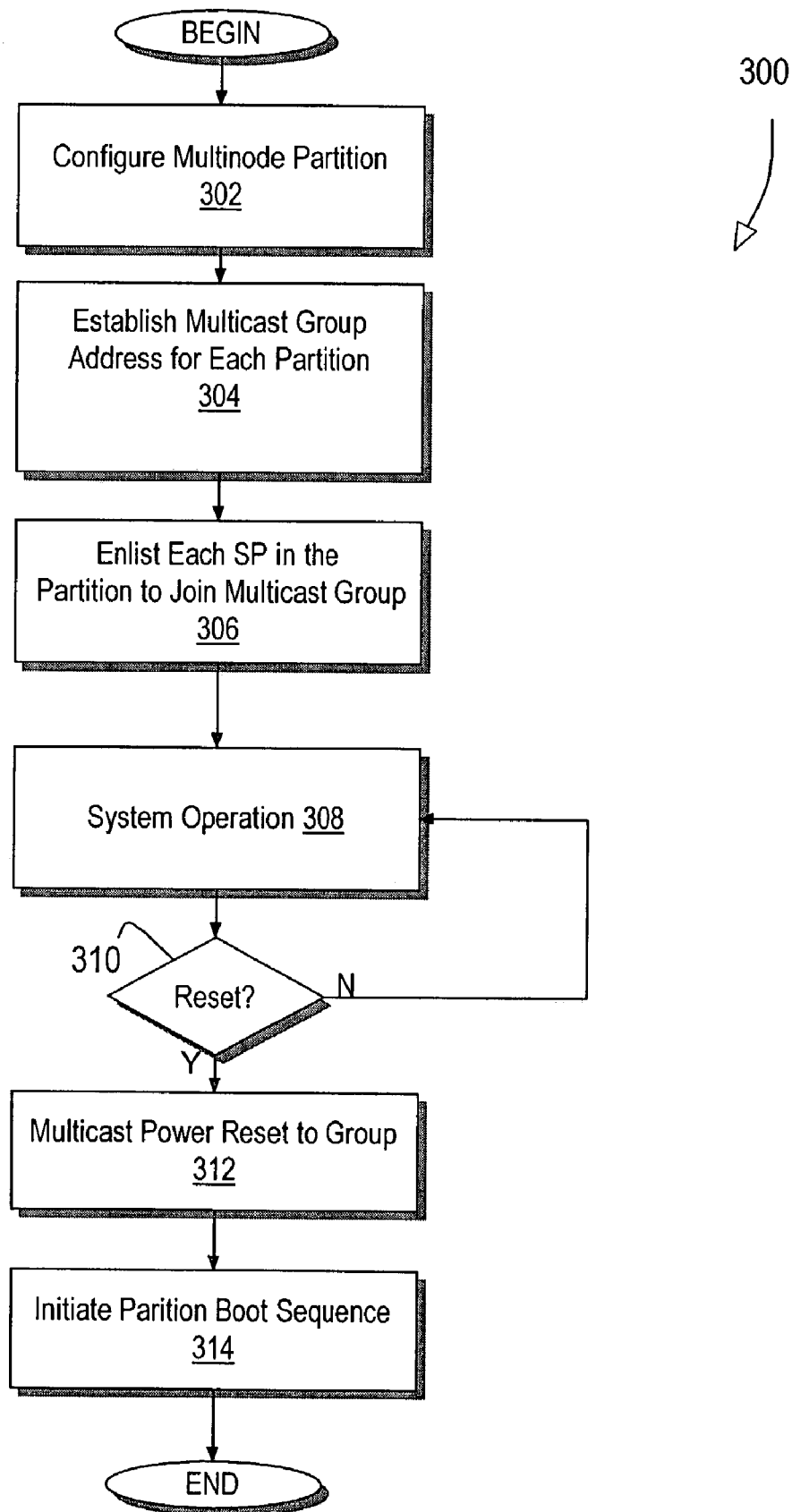
FIG. 3 is a flow diagram illustrating a method of booting a multi-node partition according to one embodiment of the present invention.

The SPM or other suitable code sequence is enabled according to the present invention to initiate a partition boot sequence that resets each of the nodes 101 within a partition 103 and then boots the nodes into a partition configuration. As depicted in FIG. 3, a reset may be received by any of the nodes 101 in a partition. If a subordinate node such as node 101B receives a reset, that node cannot initiate a partition reset because it lacks partition configuration information. In the absence of a mechanism as described herein, the reset on subordinate node 101B or 101C would leave the partition in an undetermined state in which at least one node (boot node 101A) is operating under the assumption that the system is a multi-node partition, while another node (101B) has booted into a standalone configuration.

According to the present invention however, the reset on node 101B or any other partition node 101, is routed to the boot node 101A so that a partition boot sequence is performed to configure the partition each time regardless of where the boot sequence is initiated. In the illustration, for example, the power reset is received by subordinate node 101B, which has no partition configuration information (such as the network addresses of the other service processors 108 in the partition). Lacking this important partition information limits the ability of node 101B to perform a partition wide configuration. According to the present invention, however, subordinate node 101B is able to broadcast the reset it received to each of the partition nodes thereby achieving a partition wide reset without regard to the origin of the reset. By causing the partition reset sequence to initiate in response to a reset on any node, the present invention conforms the multi-node partition to the expectations of existing system management software such that, for example, management software can send a normal power on request to any service processor in the partition.

As depicted in FIG. 2, for example, a power reset request indicated by reference numeral 202 is received by subordinate node 101B of multi-node partition 103A. Even though subordinate node 101B and, more particularly, the service processor 108 of node 101B does not contain partition configuration information such as address information for each of the service processors in partition 103A, service processor 108 is enabled to transmit or forward the power on request to each of the service processors 108 including the service processor of boot node 101A. When boot node 101A is reset, it initiates the configuration boot procedure that brings the system back into its partition configuration. In the preferred embodiment, the reset request received by any of the service processors 108 is forwarded to the other services processors over the service processor link 124, which is a sideband LAN, using a multicast group broadcast. The use of a sideband LAN to multicast or broadcast the reset command to the group beneficially eliminates compatibility issues that could otherwise occur if the reset broadcast were to take place on a shared LAN that did not accommodate or support group multicasting.

Referring now to FIG. 3, a flow diagram illustrating one implementation suitable for achieving remote power management control over a multi-node partition is presented. Portions of the invention are implemented as computer executable code (software) stored on a computer readable medium such as a hard disk, flash memory or other electrically erasable non-volatile memory, or in a volatile storage device such as system memory RAM or cache memory SRAM. When executed, this code may effect at least some of the elements represented in the flow diagram of FIG. 3.

As depicted in FIG. 3, a method 300 of remote power management in a multi-node, partitioned data processing system is depicted. In the depicted embodiment, method 300 includes configuring (block 302) multiple nodes, such as the nodes 101 of FIG. 1 and FIG. 2, as a single logical machine partition through the use of partition management software and node connectivity hardware such as the scalability link 120. Once configured, partition 103 presents a single operating system image to its users and application programs.

Following appropriate configuration, partition management software creates (block 304) a multicast address for each partition 103. In the configuration of FIG. 2, for example, two multicast group addresses will be created by the management software following configuration, a first multicast group address for partition 103A and a second group address for partition 103B. Each node and, more specifically, the service processor 108 of each node will then be invited or enlisted (block 306) by management software to join its partition's multicast group.

Normal system operation following configuration of the partitions 103 and the multicast groups is indicated by block 308 with each partition running its own operating system and application program(s) while monitoring for a power reset request. Upon detecting a power reset (block 310), the service processor receiving the request is configured to resend (block 312) the request to its multicast group address. With each service processor 108 subscribed to the appropriate multicast group, remote power management across selected nodes (i.e., only those nodes in the partition) is achieved when a service processor 108 multicasts its reset request. Because the multicast group address is associated with the boundaries of the corresponding partition 103, only those service processors 108 within the partition will recognize the multicast reset request.

In addition to resetting each node 101, the multicast reset request is guaranteed to reset the boot node of the partition 103. When the boot node is reset, the partition reset sequence is initiated (block 314) thereby assuring that the partition configuration is booted any time any of the individual nodes is booted. In this manner, the present invention further extends the partitioned concept to encompass not just the functional resources and the software image, but also the power management facilities of the individual nodes.

It will be apparent to those skilled in the art having the benefit of this disclosure that the present invention contemplates a method and system for remote power management in a multi-node partitioned system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of remote power management in a multi-node data processing system, comprising the steps of:
    configuring a plurality of nodes of the data processing system into at least one partition, wherein each node includes a corresponding service processor;
    creating a multicast address for the partition;
    enlisting the service processors in the partition in a multicast group corresponding to the multicast address; and
    configuring each service processor to respond to a power reset request by multicasting the request using the multicast address wherein each node in the multicast group is reset in response to a reset request received by any of the service processors in the group.

2. The method of claim 1, wherein multicasting the request is further characterized as multicasting the request via a sideband link connecting each of the service processors.

3. The method of claim 2, wherein the sideband link is further characterized as an Ethernet link.

4. The method of claim 2, wherein the sideband link is further characterized as an RS-485 link.

5. The method of claim 1, wherein configuring the set of nodes is further characterized as configuring a plurality of symmetric multiprocessing devices, each having a set of processors and a system memory shared among the processors.

6. The method of claim 1, wherein configuring the nodes is further characterized as configuring the nodes to include a boot node and a set of subordinate nodes, wherein the boot node, when reset, is configured to boot all of the nodes into the partition configuration.

7. The method of claim 1, wherein configuring the plurality of nodes is further characterized as configuring the nodes into a plurality of partitions wherein each node is associated with one of the plurality of partitions and further wherein establishing a multicast group address is further characterized as establishing a multicast group address for each of the plurality of partitions.

8. A data processing system, comprising:
a plurality of nodes, each node comprising a symmetric multiprocessor system;
means for configuring the plurality of nodes as at least one logical partition wherein each node is associated with one of the partitions; and
a service processor module for each node, wherein each service processor module is enabled to reset the node's power wherein each service processor is configured to respond to a power reset request by multicasting the reset request to a multicast group address, wherein the corresponding multicast group includes each service processor in the corresponding logical partition.

9. The system of claim 8, wherein the service processors are connected together via a sideband link over which the multicasted request is sent.

10. The system of claim 9, wherein the sideband link is powered independently of the nodes wherein the sideband link is operable when the nodes are powered down.

11. The system of claim 9, wherein the sideband link is further characterized as an Ethernet link.

12. The system of claim 9, wherein the sideband link is further characterized as an RS-485 link.

13. The system of claim 8, wherein each node is further characterized as having its own chassis, firmware, power supplies, and cooling fans.

14. The system of claim 13, the means for configuring the nodes as logical partitions include:
a bi-directional scalability link connecting each of the nodes in the system; and
means for sharing resources of each node in the partition under a single operating system image.

15. The system of claim 8, wherein the nodes within each partition are further characterized as including a boot node and a set of subordinate nodes, wherein the boot node, when reset, is configured to boot all of the nodes into the partition configuration.

16. The system of claim 8 configured as a plurality of partitions wherein each node is associated with one of the plurality of partitions and further wherein each partition is associated with a unique multicast group of which each node in the partition is a member such that a power reset request received by any node causes each node in the corresponding partition to reset.

17. A computer program product for remotely managing power in a multi-node data processing system, the program product being stored on a computer readable medium, comprising:
computer code means for configuring a plurality of nodes as at least one logical partition;
computer code means for establishing a multicast group address associated with the logical partition and for subscribing a service processor of each node in the partition to the multicast group;
computer code means for configuring each of the service processors in the partition to respond to a power reset request by multicasting the power reset request wherein each service processor in the partition resets the power of its corresponding node.

18. The computer program product of claim 17, wherein the code means for configuring the nodes is further characterized as code means for configuring the nodes to include a boot node and a set of subordinate nodes, wherein the boot node, when reset, is configured to boot all of the nodes into the partition configuration.

19. The computer program product of claim 17, wherein the code means for configuring the nodes is further characterized as code means for configuring the nodes into a plurality of partitions wherein each node is associated with one of the plurality of partitions and further wherein code means for establishing a multicast group address is further characterized as code means for establishing a multicast group address for each of the plurality of partitions.

20. The computer program product of claim 17, wherein the code means for configuring the service processors to multicasting the power reset is farther characterized as code means for configuring die service processors to multicast the power reset request via a sideband link.

* * * * *